United States Patent
Takahashi et al.

(10) Patent No.: US 7,140,825 B2
(45) Date of Patent: Nov. 28, 2006

(54) SELF TAPPING BOLT

(75) Inventors: Satoshi Takahashi, Saitama (JP); Hideaki Miyashita, Saitama (JP); Manabu Naoi, Gifu (JP); Takemi Matsumoto, Gifu (JP)

(73) Assignees: Honda Giken Kogyo Kabushiki Kaisha, Tokyo (JP); Meira Corporation, Aichi (JP)

( * ) Notice: Subject to any disclaimer, the term of this patent is extended or adjusted under 35 U.S.C. 154(b) by 0 days.

(21) Appl. No.: 10/330,164

(22) Filed: Dec. 30, 2002

(65) Prior Publication Data
US 2003/0143058 A1   Jul. 31, 2003

(30) Foreign Application Priority Data
Jan. 31, 2002   (JP)   ............................. 2002-022692

(51) Int. Cl.
*F16B 25/00*   (2006.01)
*F16B 25/10*   (2006.01)

(52) U.S. Cl. ................. 411/387.8; 411/418; 411/387.7; 411/387.4; 411/386; 411/387.1; 408/222; 470/198; 470/199

(58) Field of Classification Search ........ 411/386–387, 411/387.1–387.8, 424, 392, 417, 418, 420, 411/421; 408/222; 470/198, 199
See application file for complete search history.

(56) References Cited

U.S. PATENT DOCUMENTS

| 432,526 | A | * | 7/1890 | Greer | 238/260 |
|---|---|---|---|---|---|
| 1,926,925 | A | * | 9/1933 | Wescott | 403/296 |
| 2,006,276 | A | * | 6/1935 | Nodiere | 411/392 |
| 2,165,011 | A | * | 7/1939 | Rosenberg | 411/420 |
| 2,895,368 | A | * | 7/1959 | Trigg, Jr. et al. | 411/396 |
| 3,683,437 | A | * | 8/1972 | Larson | 470/10 |
| 4,003,287 | A | * | 1/1977 | Ziaylek, Jr. | 411/418 |
| 4,042,342 | A | * | 8/1977 | Muenchinger | 428/585 |
| 4,147,088 | A | * | 4/1979 | Whittaker, Jr. | 411/387.8 |
| 4,338,054 | A | * | 7/1982 | Dahl | 411/424 |
| 4,673,323 | A | * | 6/1987 | Russo | 411/107 |
| 4,778,319 | A | * | 10/1988 | Schule | 411/387.4 |
| 5,061,137 | A | * | 10/1991 | Gourd | 411/510 |
| 5,071,301 | A | * | 12/1991 | Engelhardt et al. | 411/389 |
| 5,171,186 | A | * | 12/1992 | Lukes | 470/9 |
| 5,527,183 | A | * | 6/1996 | O'Brien | 433/174 |
| 5,727,943 | A | * | 3/1998 | Beaty et al. | 433/174 |
| 5,833,415 | A | * | 11/1998 | McSherry | 411/31 |

(Continued)

FOREIGN PATENT DOCUMENTS

CH          673877 A5 *   4/1990

(Continued)

OTHER PUBLICATIONS

English translation of previously provided CH 673 877 A5 to Keller et al., 6 pages.*

*Primary Examiner*—Katherine Mitchell
(74) *Attorney, Agent, or Firm*—Arent Fox PLLC (57) ABSTRACT

A self tapping bolt which fastens a mounting member and a receiving member while the bolt cuts internal threads on an inner surface of a tap drill hole prepared in the receiving member. The bolt includes at least one groove formed near an end of a threaded portion of the bolt and a blade for cutting the internal threads. The bolt includes the feature of the blade being formed only on a rear end surface of the groove relative to a rotational direction of the bolt which is screwed into the tap drill hole.

5 Claims, 7 Drawing Sheets

U.S. PATENT DOCUMENTS

6,679,701 B1 * 1/2004 Blacklock .................. 433/174

FOREIGN PATENT DOCUMENTS

| | | | |
|---|---|---|---|
| GB | 2178986 A | * | 2/1987 |
| GB | 0356019 A1 | * | 2/1990 |
| JP | 2-42205 | * | 2/1990 |

* cited by examiner

SELF TAPPING BOLT

FIELD OF THE INVENTION

The present invention relates to a self tapping bolt.

BACKGROUND OF THE INVENTION

A self tapping bolt, by which a mounting member is fastened to a receiving member while internal threads are being cut in a tapping hole provided in the receiving member so that an independent step of cutting of internal threads can be obviated, is often used for fastening of automobile parts in order to save costs.

Figure 6:
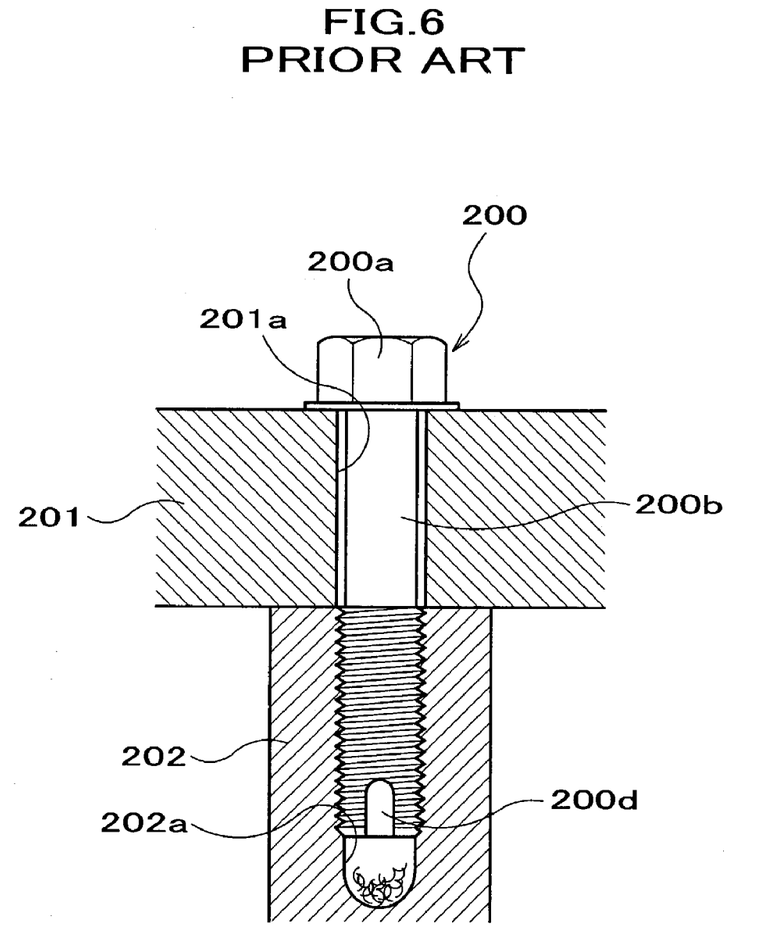
FIG. 6 is a side view showing fastening of a mounting member and a receiving member with a self tapping bolt according to the prior art.

FIG. 6 is a sectional view showing fastening of a mounting member and a receiving member with a self tapping bolt. A self tapping bolt 200 reaches a mouth of a tap drill hole 202a provided in a receiving member 202 via a through hole 201a provided in a mounting member 201. If rotational torque is then applied to a head portion 200a, a cutting portion 200d cuts an inner circumferential surface of the tap drill hole 202a to form internal threads thereon and the self tapping bolt 200 is screwed into the tap drill hole 202a simultaneously. When a bearing surface of the self tapping bolt 200 comes into contact with the mounting member 201, joint force begins to act thereon, and then the mounting and receiving members 201, 202 are fastened by the self tapping bolt 200.

Self tapping bolts are generally categorized into two types in terms of method for forming of threads, a cutting type and a rolling type. The former employs cutting and the latter rolling for forming internal threads, respectively.

A self tapping bolt of rolling type, which employs a thread rolling die to exert plastic deformation on the surface of a tap drill hole in order to form internal threads, leaves residual stress therein. This residual stress may cause a problem when a mounting member of low creep strength (e.g. magnesium alloy) is fastened by the self tapping bolt. Creep caused by the residual stress stored during forming of the internal threads and compressive force acting on the mounting member will gradually degrade the joint force of bolt.

Since the material like this for the mounting member generally has a higher coefficient of thermal expansion than that of the bolt, reduction in joint force due to creep poses a problem for elements of engine which are exposed cyclically to high and room temperature conditions. The phenomenon will develop in the following steps. Under high temperature conditions the mounting member experiences thermal expansion which is restricted by the bearing surface of bolt. The bearing surface thus exerts compressive force on the mounting member, thereby developing creep therein. When the temperature of bolt and mounting member then returns to room temperature, the joint force applied to the mounting member by the bearing surface will get smaller than that before exposure to the high temperature environment as the mounting member experiences contraction leaving the creep.

On the other hand, as internal threads are formed by cutting in a tap drill hole provided in a receiving member, a self tapping bolt of cutting type leaves less residual stress in the formed threads. The creep generated in the internal threads can in this way be reduced under the high temperature conditions, and thereby a reduction in joint force (bolt loosening), which occurs when the temperature returns to room temperature, can be restrained better compared with a self tapping bolt of rolling type.

A self tapping bolt according to the prior art has posed a problem that internal threads are unavoidably cut again when a fastened bolt needs to be unscrewed. A typical self tapping bolt of cutting type according to the prior art is shown in FIG. 7.

Figure 7A:
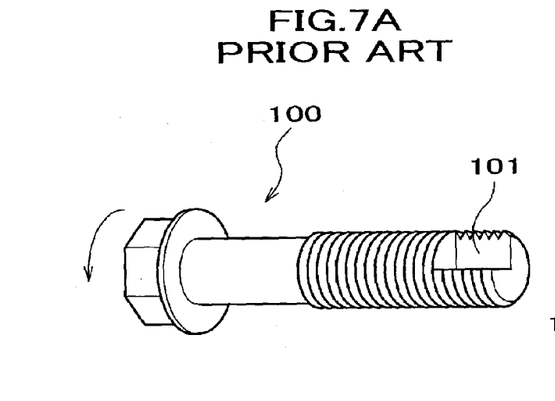
FIG. 7 is a view showing a self tapping bolt according to the prior art.
Figure 7B:
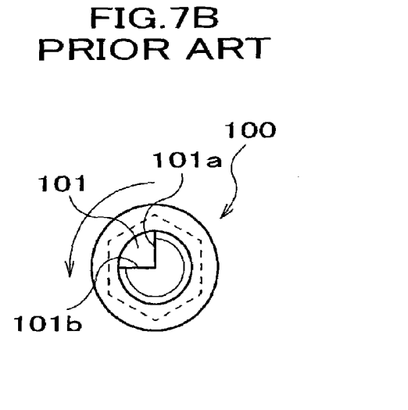

A self tapping bolt 100 shown in FIGS. 7A and 7B has a cutout 101, the cross section of which occupies a quarter of a circular cross section of threaded portion. When the self tapping bolt 100 is screwed into a tap drill hole in a rotational direction shown by the arrows in the figures, an end surface 101a of cutout 101 cuts a surface of tap drill hole provided in a receiving member, forming internal threads. If the occasion arises that the self tapping bolt 100 needs to be unscrewed, the other end surface 101b unnecessarily cuts the internal threads having already been formed.

Figure 7C:
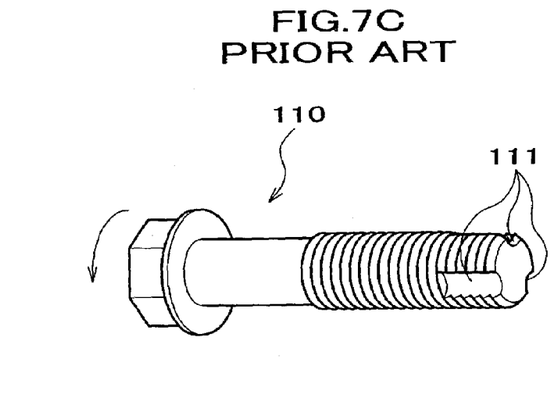
Figure 7D:
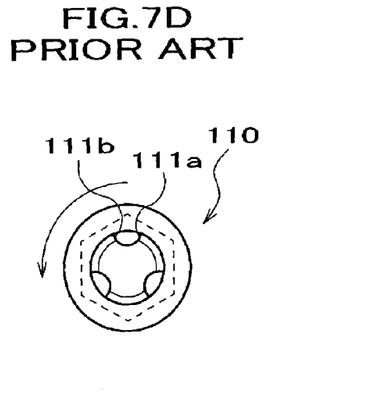

A self tapping bolt 110 shown in FIGS. 7C and 7D has three cutouts 111, which are spaced at circumferentially equal intervals. When the self tapping bolt 110 is unscrewed, an end surface 111b of each of cutouts 111 also cuts internal threads having already been formed, like the self tapping bolt 100.

In this way, self tapping bolts such as 100 and 110 have a problem that they can not withstand repeated handling, since the internal threads get thinner each time unscrewing of bolt is conducted, resulting in degradation of dimensional accuracy of threads and a gradual reduction in joint force.

SUMMARY OF THE INVENTION

The object of the present invention to assess the problems described above is to provide a self tapping bolt of cutting type which can withstand repeated handling of screwing and unscrewing.

The present invention provides a self tapping bolt which fastens a mounting member and a receiving member while the bolt cuts internal threads on an inner surface of a tap drill hole prepared in the receiving member. The bolt includes at least one groove formed near an end of a threaded portion of the bolt and a blade for cutting the internal threads. The bolt has a feature that the blade is formed only on a rear end surface of the groove relative to a rotational direction of the bolt which is screwed into the tap drill hole.

When the bolt is unscrewed, the internal threads will not thus be cut again since the blade is provided only on the rear end surface of groove, which limits forming of the internal threads in the tap drill hole only to an occasion when the bolt is screwed.

The present invention also provides a self tapping bolt, in which $\theta_F$ defining a first angle between a front end surface of the groove and a first tangent at a first intersection of the front end surface and a circumferential surface of the threaded portion is greater than 90 degrees and less than 180 degrees (90 deg.$<\theta_F<$180 deg.), and $\theta_B$ defining a second angle between the rear end surface of groove and a second tangent at a second intersection of the rear end surface and the circumferential surface of the threaded portion is equal to or greater than 60 degrees and less than or equal to 90 degrees (60 deg.$\leq\theta_B\leq$90 deg.).

In this way, the blade is formed on the rear end surface, which makes the angle of $\theta_B$ with the second tangent (60 deg.$\leq\theta_B\leq$90 deg.), and thereby it is possible for the blade to cut the internal threads on the inner circumferential surface of tap drill hole when this self tapping bolt (hereinafter shortly referred to as a bolt) is screwed into the tap drill hole.

On the other hand, no blade is formed on the front end surface, which makes the angle of $\theta_F$ with the first tangent (90 deg.<$\theta_F$<180 deg.), and therefore the front end surface will not cut again the internal threads having already been formed.

The present invention still provides a self tapping bolt, in which a diameter D of a circle defined by the deepest point of the groove relative to an axis of the bolt is equal to or greater than a minor diameter of threads of the threaded portion multiplied by 0.9 and less than or equal to a diameter of the tap drill hole (a minor diameter of threads of the threaded portion×0.9≦D≦a diameter of the tap drill hole).

In this way, since the diameter D is maintained equal to or greater than the minor diameter of threads of the threaded portion×0.9, the required shear strength of bolt can be achieved while keeping a mating area with the internal threads. Further, the diameter D is maintained less than or equal to the diameter of tap drill hole, the internal threads can be formed with assurance in the tap drill hole provided in the receiving member.

The self tapping bolt according to the present invention restricts forming of the internal threads only to an occasion when the bolt is screwed, thereby enabling a long term stability of dimensional accuracy for the threads and protection against degradation of joint strength even if handling of screwing and unscrewing is repeated.

The present invention yet provides a self tapping bolt, in which the front end surface is formed to be convexly curved in a radially outward direction of the bolt. In this way the front end surface is in contact with the outer circumferential surface of bolt smoothly and the angle $\theta_F$ can get infinitely close to 180 degrees, so that it is possible to lessen a risk of damaging the internal threads when the bolt is unscrewed.

The present invention further provides a self tapping bolt, in which the bolt has a radially reduced body between a head and a threaded portion of the bolt. A diameter of the body is smaller than a minor diameter of male threads.

A smaller spring constant can be selected for the reduced body by reducing the diameter thereof. When the mounting member experiences thermal expansion under a high temperature condition, the radially reduced body, which has flexibility to expand in an axial direction with the smaller spring constant, can in this way absorb the expansion. The creep in the mounting member is thus reduced because of a reduction in the stress applied to the mounting member by the bearing surface of bolt. Therefore, a reduction in joint force (loosening of the bolt) caused by the creep in the mounting member can be restrained when the temperature returns to room temperature.

The present invention still further provides a self tapping bolt, in which the radially reduced body is configured so that its diameter gradually increases towards the head of bolt and fits in with that of a through hole provided in the mounting member.

According to the feature described above, a measure is prepared for a possible problem associated with a wider gap between the through hole of mounting member and the radially reduced body. Since a self tapping bolt needs to be screwed with large rotational torque so that it can be fastened in parallel with cutting of internal threads in a tap drill hole provided in a receiving member, the problem that the axis of bolt is misaligned could possibly occur.

Even if misalignment occurs while rotational torque is applied to it, the bolt according to the present invention, which has the radially reduced body described above, can align the axis of bolt gradually with that of the tap drill hole and through hole by interaction between the edge of through hole and the extended portion of radially reduced body according as fastening of the bolt progresses.

The present invention yet further provides a self tapping bolt, in which the bolt has a dog point for guiding the bolt into the tap drill hole provided in the receiving member.

The bolt according to the invention, which has the dog point, can prevent a blade from forming internal threads misaligned with the axis of tap drill hole provided in the receiving portion.

DESCRIPTION OF THE PREFERRED EMBODIMENTS

While the invention is described in detail and with reference to specific embodiments thereof, it will be apparent to one skilled in the art that various changes and modifications can be made therein without departing from the spirit and scope thereof.

Figure 1A:
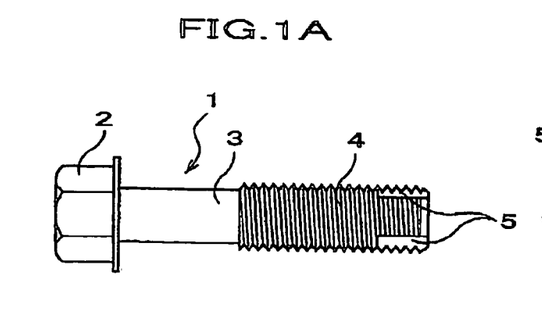
FIGS. 1A, 1B, 1C and 1D are views showing a self tapping bolt according to a first embodiment of the present invention.
Figure 1B:
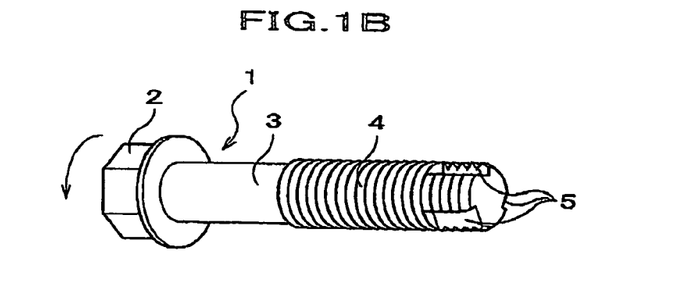
Figure 1C:
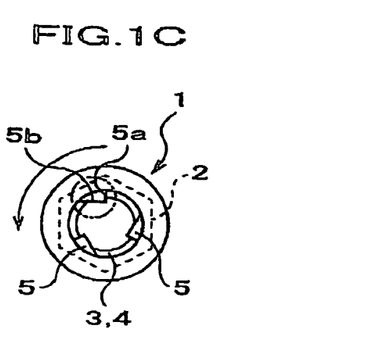
Figure 1D:
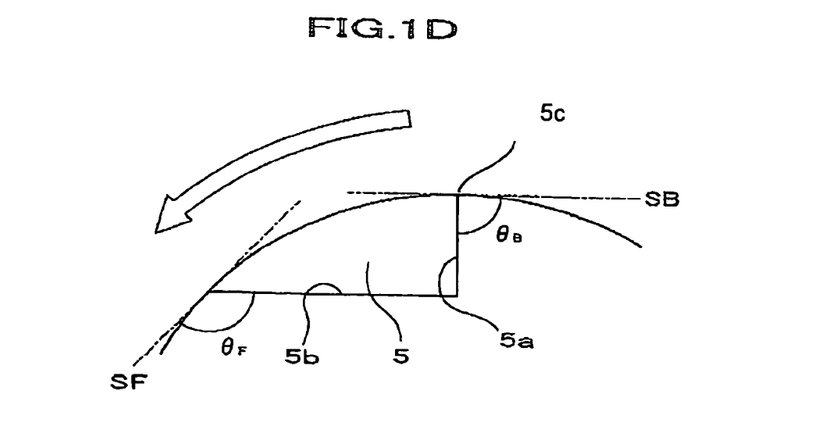

FIGS. 1A, 1B and 1C show a first embodiment of the present invention. FIG. 1A is a side view showing a self tapping bolt of the present invention, FIG. 1B is a perspective view, FIG. 1C is a front view seeing from an end of threaded portion of the bolt and FIG. 1D is an enlarged view showing the vicinity of the cutout shown in FIG. 1C.

A self tapping bolt 1 includes a head 2 of hexagon head to which rotational torque is applied by a tool such as a spanner, a threaded portion 4 producing joint force by engaging with internal threads cut by cutouts 5 and a neck portion 3 connecting the head 2 and the threaded portion 4. Three pieces of the cutouts 5, which are for cutting internal threads in a tap drill hole bored in a receiving member while the bolt 1 is screwed into, are provided in the vicinity of the end of threaded portion 4 over a predetermined length, being spaced at circumferentially equal intervals of 120 deg.

In the embodiment of present invention, a cutout 5 has a cross section of wedge and is made of an upright surface 5a with a blade 5c T and a sloped surface 5b (see FIG. 1C). The cutout 5 is made by cutting a wedge on the threaded portion 4.

"A groove", "a front end surface" and "a rear end surface" described in the claims of present invention refer to "a cutout 5", "a sloped surface 5b" and "an upright surface 5a", respectively.

The upright surface 5a cuts the tap drill hole bored in the receiving member to form internal threads while the bolt 1 is screwed into. The upright surface 5a stands substantially perpendicular to the inner circumferential surface of tap drill hole and has a blade 5c for cutting internal threads. As shown in FIG. 1D, the upright surface 5a makes an angle $\theta_B$ with a tangent SB defined at an intersection between the surface 5a and the outer circumferential surface of bolt 1. It is preferred that the angle $\theta_B$ should be equal to or greater than 60 deg. and less than or equal to 90 deg. If the angle $\theta_B$ exceeds 90 deg., it will not be advantageous because the upright surface 5a stands so oblique relative to the tangent SB that the capability of cutting of internal threads by the upright surface 5a diminishes. On the other hand, if the angle $\theta_B$ is less than 60 deg., it will not be advantageous, either. The reason for it is that the upright surface 5a overhangs so much that the pointed end of upright surface 5a is likely to wear out in cutting of internal threads to be dull gradually.

Figure 2A:
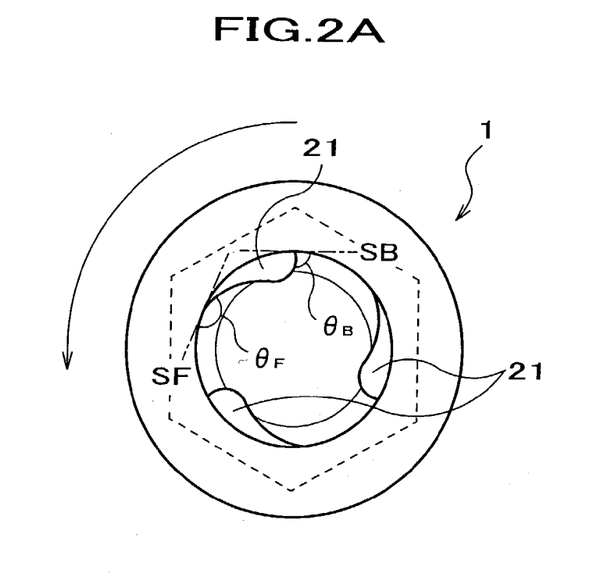
FIGS. 2A and 2B are conceptual views showing groove configurations.

The sloped surface 5b, which is configured to be oblique to the inner circumferential surface of tap drill hole, has no blade to cut threads. As shown in FIG. 1D, the sloped surface 5b makes an angle $\theta_F$ with a tangent SF defined at an intersection between the sloped surface 5b and an outer circumferential surface of bolt 1. It is preferred that the angle $\theta_F$ should be greater than 90 deg. and less than 180 deg. When the bolt 1 is unscrewed, the sloped surface 5b without blade will not cut again the internal threads having been cut by the upright surface 5a. If the angle $\theta_F$ is less than or equal to 90 deg, it will not be advantageous as the sloped surface 5b, which comes to stand too upright, is likely to cause damage to the internal threads while the bolt 1 is unscrewed. It is more preferable if the angle $\theta_F$ is equal to or greater than 120 deg. and less than 180 deg. Further, the more preferable it will be, the closer to 180 deg. the angle $\theta_F$ approaches, since the damage given to the internal threads can be restrained more effectively. However, it is practically preferable that the angle $\theta_F$ should be equal to or greater than 135 deg. and less than 150 deg, taking into account convenience in terms of manufacturing in forming of the sloped surface 5b. If an intersection between the sloped surface 5b and an outer circumferential surface of the threaded portion 4 is rounded, it will further reduce the possibility of causing damage to the internal threads (see FIG. 2A).

It is preferable that a diameter D of circle defined by the deepest point of each of three cutouts 5 should be equal to or greater than a thread minor diameter multiplied by 0.9 and less than or equal to a diameter of tap drill hole (thread minor diameter×0.9≦D≦diameter of tap drill hole). If the diameter D is less than the thread minor diameter multiplied by 0.9, it will not be preferable as the shearing strength of bolt 1 drops due to a reduction in the effective cross section area of bolt 1 caused by excessive depth of cutout 5. If the diameter D is greater than that of tap drill hole, it will not be preferable either, because the depth of cutout 5 is so small that cutting of the internal threads becomes difficult.

The self tapping bolt 1 of the present invention, which employs the upright surface 5a to cut the internal threads in the tap drill hole only when the bolt 1 is screwed into and the sloped surface 5b that does not cut the internal threads again when the bolt 1 is unscrewed, can maintain dimensional accuracy for the internal threads over a long period of time, thereby preventing a reduction in joint strength even if repeated handling of screwing and unscrewing is applied to the bolt 1.

It is not limited to the embodiment of the present invention, which employs a cutout 5 having a cross section of wedge as groove for cutting. However, other cross sections of different shapes can be alternatively used as long as a front end surface does not have a blade but only a rear end surface has one. In this way internal threads can be cut in a tap drill hole bored in a receiving member when a bolt 1 is screwed into but the formed internal threads can not be cut again when the bolt 1 is unscrewed. For example, grooves 21 shown in FIG. 2A may be selected. Each of the grooves 21 has a front surface convexly curved in a radially outward direction. An angle made by a tangent at a point on the front surface and the other tangent at the intersection of the front surface and the outer circumferential surface of bolt 1 continuously increases as the point moves toward the intersection. A groove 21 of this type makes it feasible for an angle $\theta_F$ to approach infinitely close to 180 deg., thereby reducing a possibility that the front end surface causes damage to the formed internal threads.

Figure 2B:
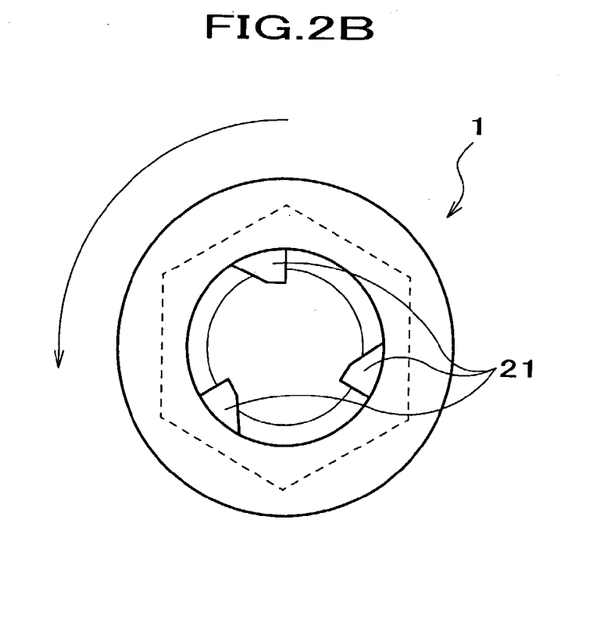

Another groove which has a flat bottom shown in FIG. 2B may also be an alternative.

In this case, a desirable range of angle $\theta_F$ made by the front end surface of groove 21 and the tangent SF is same as that of sloped surface 5b described before and the other desirable range of angle $\theta_B$ made by the rear end surface and the tangent SB is same as that of upright surface 5a.

The number of grooves 21 cut in the threaded portion 4 is not limited to three either, but a minimum number of one can provide the same effect of the present invention. However, if the number is too large, it will not be preferable as the joint force decreases due to a reduction in contact area between the threaded portion of bolt and receiving member. The number should be desirably optimized for individual cases taking into account cutting of internal threads and contact area between a threaded portion and a receiving member. It is also preferable that the grooves 21 should be located in axial symmetry so that tapping can be conducted stably.

Figure 3A:
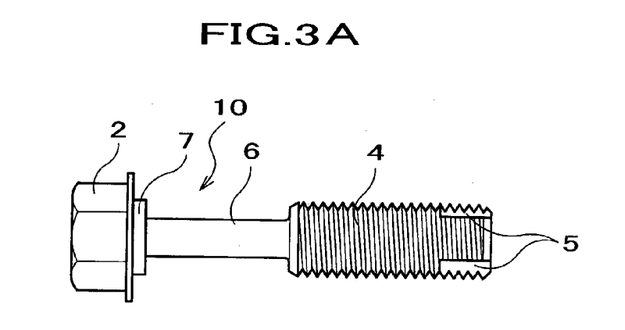
FIGS. 3A, 3B and 3C are views showing a self tapping bolt according to a second embodiment of the present invention.
Figure 3B:
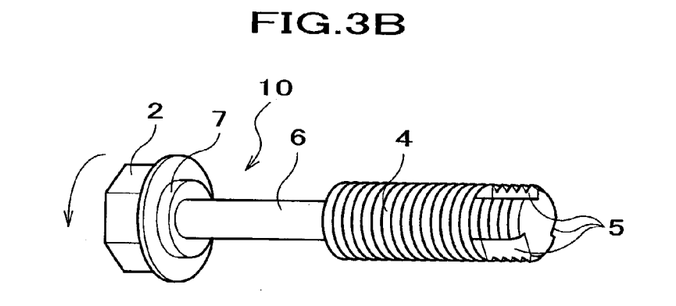
Figure 3C:
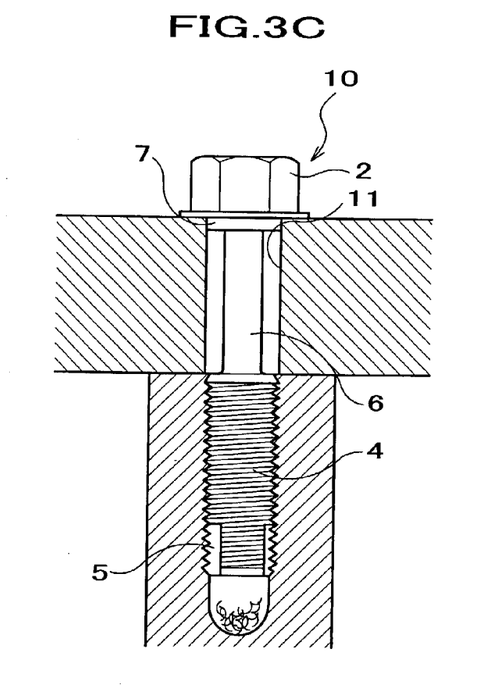

FIGS. 3A 3B and 3C show a self tapping bolt according to a second embodiment of the present invention. FIG. 3A is a side view showing a self tapping bolt of the second embodiment, FIG. 3B a perspective view and FIG. 3C is a sectional view showing mounting and receiving members fastened with a self tapping bolt of the present embodiment.

Different from the first embodiment, which has the neck portion 3 with the substantially same diameter as the major diameter of threaded portion 4 (see FIG. 1), a self tapping bolt 10 of the present embodiment has a radially reduced body 6, which includes a portion between a head 2 and a threaded portion 4 and has a diameter smaller than the minor diameter of male threads of threaded portion 4. And a body 7, which has the substantially same diameter as that of a through hole 11 of mounting member, is provided right under the head 2.

Since the radially reduced body 6 has a smaller diameter, the spring constant thereof gets smaller than that of bolt 1 of the first embodiment, thereby allowing better flexibility for the radially reduced body 6 in an axial direction of bolt 10.

Even if the mounting member experiences thermal expansion under high temperature conditions, the radially reduced body 6 can absorb the expansion of mounting member to some extent as the radially reduced body 6 with a smaller spring constant expands axially, thereby reducing the stress imposed on the mounting member by the bearing surface and restraining creep therein. In this way, when the temperature of mounting member is returned to room temperature, it is possible to restrain a reduction in joint force caused by the creep of mounting member.

The diameter of radially reduced body 6 may be selected arbitrarily as long as it can extend depending on the expansion of mounting member and restrain the creep therein under high temperature conditions. If a smaller diameter is selected for the radially reduced body 6, the axial strength of bolt 10 can be compensated by employing a material having higher strength which can restrain plastic deformation thereof when the temperature returns from high to room temperature.

The body 7 is an element for securely guiding the bolt 10 into the through hole 11 bored in a mounting member. In the bolt 10 of the present embodiment, which has a reduced diameter of neck portion, the axis of radially reduced body 6 becomes susceptible to misalignment while the bolt is screwed into. In such an occasion, the body 7 helps guide the bolt 10 into the through hole 11 securely.

FIGS. 4A through 4D show a third embodiment of the present invention.

Figure 4A:
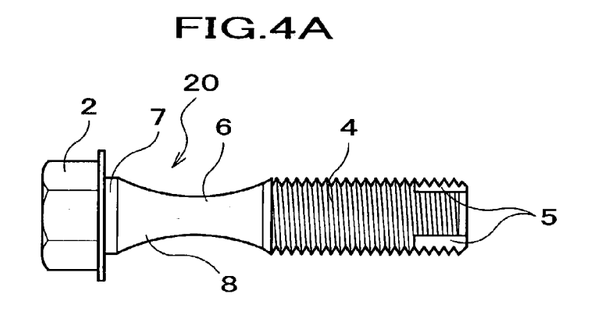
FIGS. 4A, 4B, 4C and 4D are views showing a self tapping bolt according to a third embodiment of the present invention.
Figure 4B:
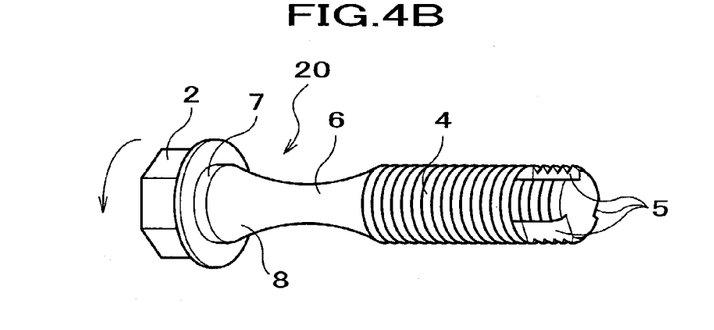
Figure 4C:
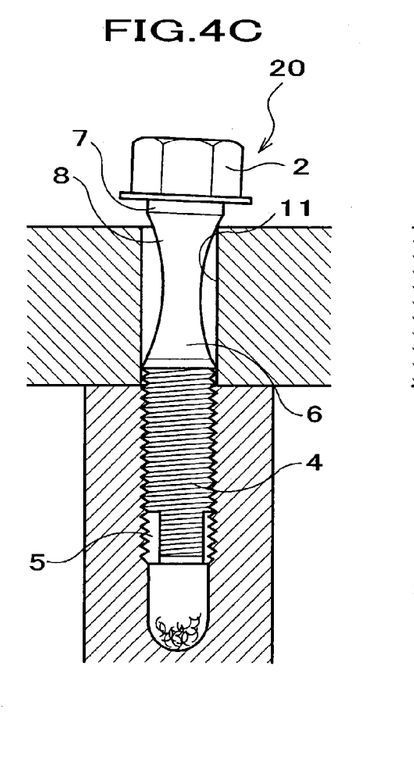
Figure 4D:
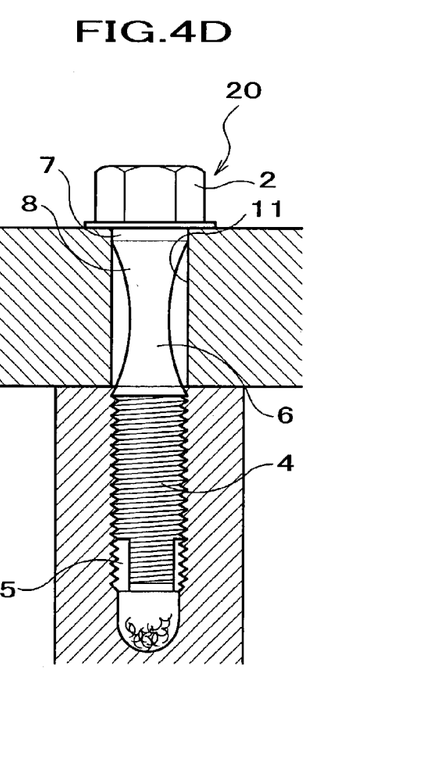

FIG. 4A is a side view showing a self tapping bolt according to the present embodiment, FIG. 4B a perspective view, FIG. 4C is a conceptual view showing a self tapping bolt, which is being screwed into a through hole while misalignment is corrected by a tapered portion and FIG. 4D is a conceptual view showing a self tapping bolt, which has been properly mated with a through hole after correction of the misalignment.

A bolt 20 of the third embodiment, which has a radially reduced body 6, is in this respect similar to the bolt 10 of the second embodiment, but is different from it in terms of a tapered portion 8, the diameter of which increases toward the head 2 of bolt 20.

As described in the second embodiment, a problem may occur that a neck portion of bolt 20 with reduced diameter is likely to be misaligned by rotational torque applied to the bolt 20 when it is screwed into.

In order to solve the problem, the third embodiment employs the tapered portion 8 of radially reduced body 6, which comes into contact with the through hole 11 (see FIG. 4C) if the bolt 20 misaligned at the start of insertion is continued to screw into. The axis of neck portion can be corrected gradually while the tapered portion 8 is guided to screw into the through hole 11 and thereby fastening is properly performed as the axis of through hole 11 and that of radially reduced body 6 will be aligned in completion of fastening.

FIG. 4C is a figure illustrating how the radially reduced body 6 is screwed into while the tapered portion 8 is correcting the misalignment of axis of radially reduced body 6. Even if the axis of radially reduced body 6 is somewhat misaligned with the axis of through hole 11, the tapered portion 8 corrects gradually the misalignment by physical interaction with the through hole 11.

Figure 5A:
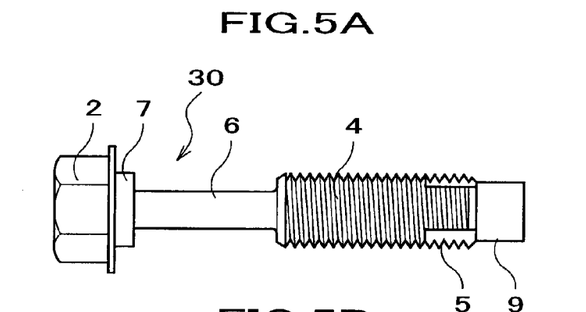
FIGS. 5A, 5B and 5C are views showing a self tapping bolt according to a fourth embodiment of the present invention.
Figure 5B:
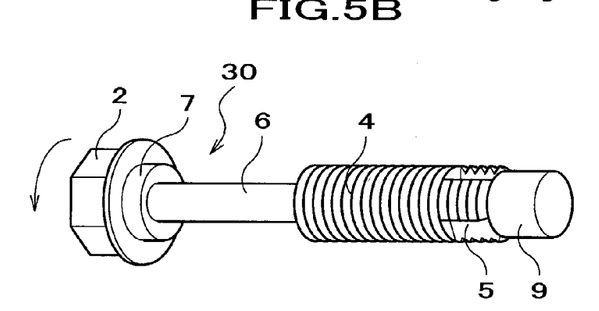
Figure 5C:
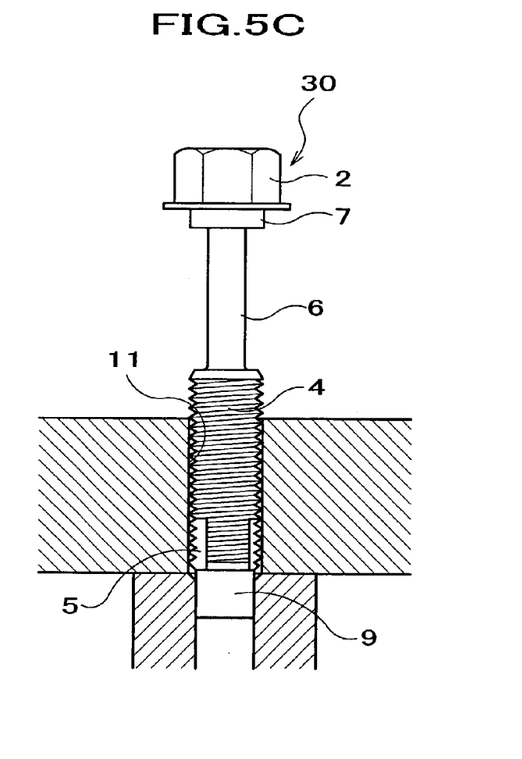

FIGS. 5A, 5B and 5C show a self tapping bolt of a fourth embodiment.

FIG. 5A is a side view showing a self tapping bolt, FIG. 5B is a perspective view, and FIG. 5C is a conceptual view showing a dog point which is mated with a tap drill hole.

A self tapping bolt 30 of the fourth embodiment is same as the bolt 10 of the second embodiment except for a dog point 9 which is provided at the end of threaded portion 4 of bolt 30.

When mounting and receiving members are fastened, the dog point 9 is mated with a tap drill hole provided in a receiving member. Since the diameter of dog point 9 is substantially same as that of the tap drill hole, the bolt 30 can be inserted thereinto perpendicularly (FIG. 5C). In this way, the misalignment can be prevented when force is applied to the bolt 30 for cutting internal threads in a tap drill hole.

What is claimed is:

1. A self tapping bolt which fastens a mounting member and a receiving member while said bolt cuts internal threads on an inner surface of a tap drill hole prepared in said receiving member, comprising:
    at least one groove formed near an end of a threaded portion of said bolt;
    a blade for cutting said internal threads, wherein said blade is formed only on a rear end surface of said at least one groove relative to a rotational direction of said bolt which is screwed into said tap drill hole;
    a radially reduced body having a diameter which is smaller than a minor diameter of male threads, between a non-threaded head and said threaded portion of said bolt, said non-threaded head having a constant outer diameter; and
    a body whose diameter is larger than the radially reduced body and substantially the same as a diameter of a through hole of said mounting member in order to guide said bolt into said through hole,
    wherein the radially reduced body is directly adjacent to both the threaded portion and the larger diameter body, and
    wherein the larger diameter body is adjacent to both the non-threaded head and the radially reduced body.

2. A self tapping bolt according to claim 1, wherein said radially reduced body is configured so that said diameter of said radially reduced body gradually increases towards said head of bolt and fits into said diameter of said through hole provided in said mounting member.

3. A self tapping bolt according to claim 1, wherein said bolt has a dog point for guiding said bolt into said tap drill hole provided in said receiving member.

4. A self tapping bolt according to claim 1, wherein $\theta_F$ defining a first angle between a front end surface of said at least one groove and a first tangent at a first intersection of said front end surface and a circumferential surface of said threaded portion is greater than 90 degrees and less than 180 degrees, 90 degrees$<\theta_F<$180 degrees, and $\theta_B$ defining a second angle between said rear end surface of said at least one groove and a second tangent at a second intersection of said rear end surface and said circumferential surface of said threaded portion is equal to or greater than 60 degrees and less than or equal to 90 degrees, 60 degrees$\leq\theta_B\leq$90 degrees.

5. A self tapping bolt according to claim 4, wherein said front end surface is formed to be convexly curved in a radially outward direction of said bolt.

* * * * *